United States Patent [19]

Abram et al.

[11] Patent Number: 5,011,360
[45] Date of Patent: Apr. 30, 1991

[54] SELF-EMPTYING CONTAINER

[75] Inventors: David A. S. Abram, Troon; Bruce W. Wishart, East Kilbride, both of Scotland

[73] Assignee: Empteezy Limited, West Lothian, Scotland

[21] Appl. No.: 259,264

[22] Filed: Oct. 18, 1988

[51] Int. Cl.⁵ .............................................. B65G 65/00
[52] U.S. Cl. .................................. 414/424; 220/324; 414/422; 414/608; 414/654
[58] Field of Search ............... 414/422, 424, 414, 607, 414/608, 420, 639, 642, 645–647, 652, 654; 298/27, 29, 2, 23 A, 23 B; 220/324

[56] References Cited

U.S. PATENT DOCUMENTS

| 2,582,759 | 1/1952 | Sass ................................. 414/422 X |
| 2,606,675 | 8/1952 | Jones ............................... 414/424 X |
| 2,730,253 | 1/1956 | Oswalt ............................. 414/414 X |
| 3,013,684 | 12/1961 | King et al. ...................... 414/422 X |
| 3,719,296 | 3/1973 | Larson, Jr. ...................... 414/422 |
| 4,334,820 | 6/1982 | Homura ............................ 414/422 |
| 4,403,901 | 9/1983 | Kopczynski .................... 414/424 X |

FOREIGN PATENT DOCUMENTS

| 0180694 | 5/1986 | European Pat. Off. . |
| 3217561 | 12/1982 | Fed. Rep. of Germany . |
| 233353 | 2/1986 | Fed. Rep. of Germany . |
| 2471334 | 6/1981 | France . |
| 2579187 | 9/1986 | France . |
| 1202398 | 8/1970 | United Kingdom ............... 414/414 |

OTHER PUBLICATIONS

European Search Report/Application No. EP 87 30 7156.

*Primary Examiner*—David A. Bucci
*Attorney, Agent, or Firm*—Sixbey, Friedman, Leedom & Ferguson

[57] ABSTRACT

The self-emptying container has relatively moveable parts (10, 11, 40, 41) normally secured together by a latch mechanism. In one embodiment, the container has an upright body (10) and a pivotal base (11). In another embodiment the body is a tipping skip or hopper (40) on a pallet base (41). The latch mechanism (19, 49) comprises a fore and aft flat bar (22, 52) pivoted at one end. The other end locates below the horizontal limb (29, 59) of an L shaped latch member (24, 54) which is lifted by the flat bar (22, 52) when an upward pressure is applied to the bar. That is done via lift apparatus such as a fork lift truck. The container is raised over a surface (S) and lowered onto that surface to pivot the flat bar (22, 52) upwards causing the latch member (24, 54) to release the relatively moveable parts to empty the container. In the first embodiment, the container is then raised so that the base pivots open. In the second embodiment the skip body 40 tips forward. During emptying the pressure on the flat bar (22, 52) is removed so that the latch returns to its locking position so that the relatively moveable parts will automatically latch together when the base is raised to its closed position or the skip body tips back to its loading position.

22 Claims, 2 Drawing Sheets

SELF-EMPTYING CONTAINER

BACKGROUND OF THE INVENTION

1. Field of the Invention

This invention relates to self-emptying containers, particularly containers which carry material in bulk to be emptied therefrom for further processing.

Such containers are used in industry for a variety of purposes from simple collection of rubbish or waste to the collection of material in bulk waste paper, scrap metal, broken glass etc., to be taken usually by a fork lift truck or trolley for further processing.

2. Description of the Prior Art

Such containers include open topped containers in which the base is pivotal but retained closed by a latch. Manual unlatching frees the base to pivot open when the container is lifted (e.g. by a fork lift) or tilted.

Another such container is a self tipping skip/self dumping hopper. This type of container has a skip or hopper, i.e. an open topped container body mounted on a vase and pivotal in a constant plane between a normal 'loading' position in which the body is upright and a tipped-forward 'emptying' position. The body has a bottom which is the normal disposition of the body angles upwards and forwards. When the body is loaded, it tends to over balance and tip forward but is restrained by a latch which requires to be manually released. When the body is free to do so it tips forward on curved edges which roll along the base, and when the container body empties, it returns by gravity to its normal position. This type of self emptying container will hereinafter and in the claims be referred to as a 'tipping skip of the type aforesaid'.

A disadvantage of such containers is that the manually operated latch is often beyond the reach of the driver of a trolley or fork lift truck carrying the container, as a result, the driver has to waste time by leaving the driving seat and often has to clamber to reach the level when the container is elevated.

SUMMARY OF THE INVENTION

It is an object of this invention to provide a container which will automatically empty its contents without the need for manual assistance other than operation of the fork lift truck or other lifting apparatus such as a crane.

According to one aspect of the present invention, there is provided a self-emptying container adapted to be lifted by mechanical lift apparatus and having relatively moveable parts moveable to allow emptying and a pressure actuated latch mechanism to normally hold said parts together to prevent emptying, said container having a base and said latch mechanism extending below said base and being actuated to unlatch said relatively moveable parts when movement of the container via the lift apparatus bring the latch mechanism into contact with a surface to generate the required pressure on the mechanism to cause unlatching of the parts.

According to another aspect of the present invention there is provided a self-emptying container having a base and upstanding surrounding wall, the base being hinged to the wall so that the base and wall are relatively pivotal to open the bottom of the container, a latch mechanism mounted below the base to lock the base against relative pivotal movement and means on the container for connection of the container to lifting apparatus, the latch mechanism being actuated to unlock the base when movement of the container via the lifting apparatus brings the latch mechanism into contact with a surface to generate the required pressure on the latch mechanism, after which lifting of the container by the lifting means will cause the bottom of the container to open by gravity and allow emptying of the contents from the container.

According to a further aspect of the present invention there is provided a self-emptying container in the form of a tipping skip of the type aforesaid in which the skip is latched to the base by a pressure operated latch mechanism mounted below the level of the base and the base has means for connection to lifting apparatus, the latch mechanism being actuated to release the skip for tipping relative to the base when movement of the container via the lifting apparatus brings the latch mechanism into contact with a surface to generate the required pressure on the latch mechanism.

DESCRIPTION OF THE PREFERRED EMBODIMENTS

Figure 1:
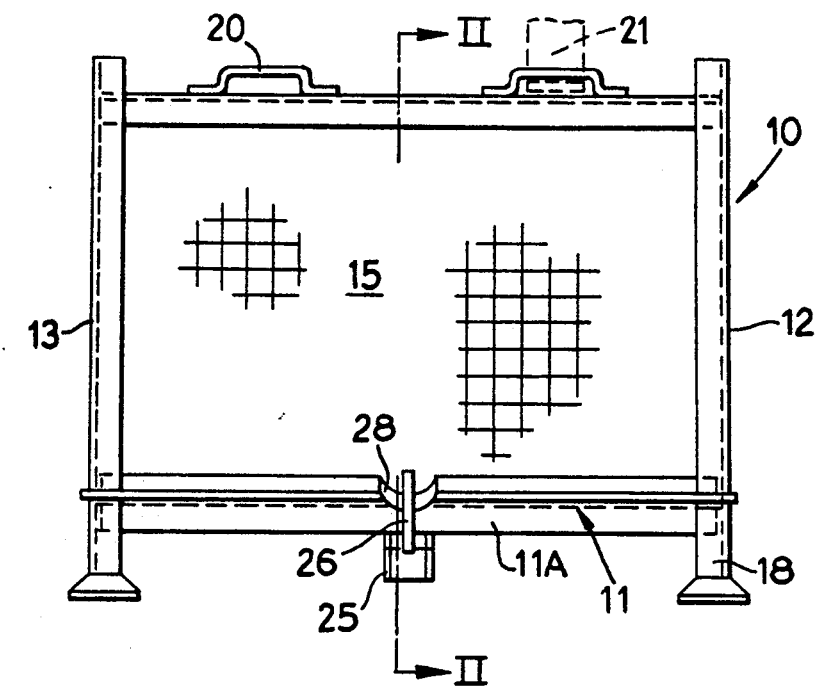
FIG. 1 is a front view of a self-emptying container according to the invention.
Figure 2:
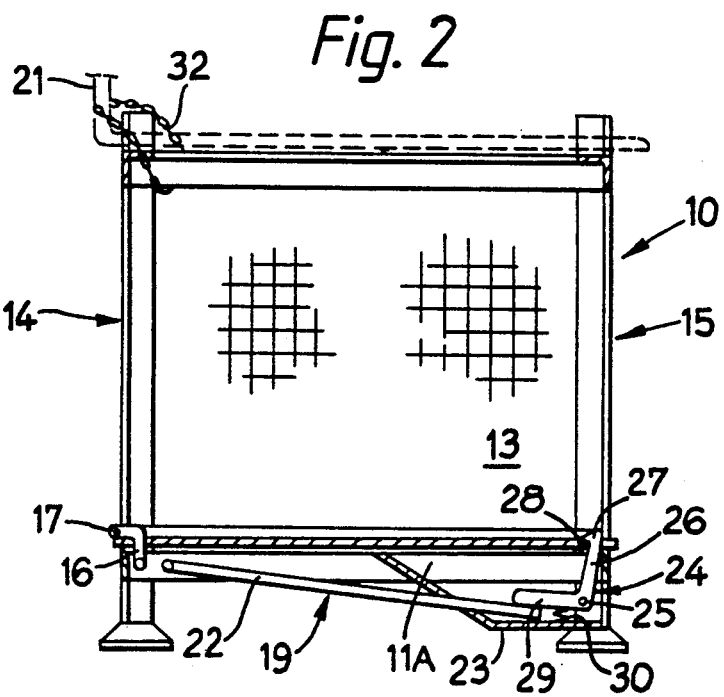
FIG. 2 is a sectional side elevation on the line II—II of FIG. 1.
Figure 3:
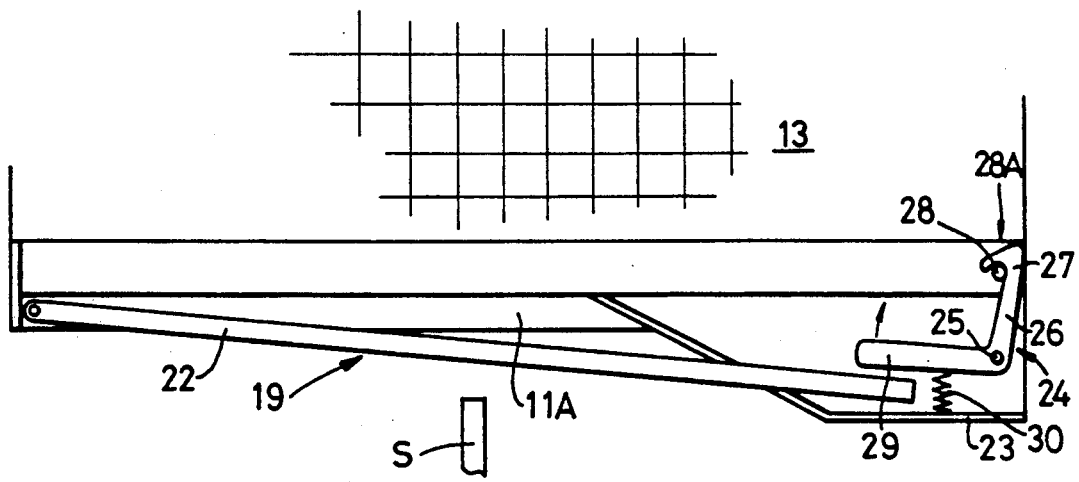
FIG. 3 is an elevation to an enlarged scale of the latch mechanism.

Referring firstly to FIGS. 1 to 3 of the drawings, the self-emptying container is square with relatively moveable parts namely, body 10 and a base 11. The body 10 comprises an upstanding wall having two side walls 12, 13, a rear wall 14 and a front wall 15. The base 11 is hinged to the rear wall 14 via angled brackets 16 on the base engaging pins 17 mounted on the rear wall. Thus the base is pivotal relative to the upstanding wall 12. A foot 18 is located at each corner of the base to support it raised off the ground.

A pressure actuated latch mechanism 19 is provided below the base to normally lock the base to the surrounding wall, the latch being released by movement of the container to bring the mechanism against an object or structure as hereinafter explained.

The container has lift means, in this embodiment, a pair of brackets 20 on top of the front and rear walls 15, 14 to receive the forks 21 of a fork lift truck, by means of which the container can be moved, for example from a collection point on a factory floor to a communal skip into which the contents of the container, such as factory rubbish, is to be dumped.

In this embodiment the latch mechanism 19 comprises an actuator in the form of an elongate flat bar 22 which lies fore and aft, is pivotally connected to the rear of the base and extends forwardly and at a slight downward angle into a casing 23 which is mounted below the front of the base and extends slightly forwardly thereof. Within the casing is an L shaped latch member 24 pivotally carried on a pin 25 which passes through the casing walls. One limb 26 of the latch member is substantially upright and has a hooked end 27 to engage a horizontal latch pin 28 carried on the lower rim of the front wall 15 of the container on brackets 28A. The other limb 29 of the latch member 24 is longer than limb 26 and is substantially horizontally disposed. It is biassed downwards by gravity, assisted by spring 30.

The forward end of the flat bar 22 locates under the rear end of horizontal limb 29 so that upward pivotal movement of bar 22 will lift limb 29 causing it to pivot upwards and the other limb 26 to pivot forwardly outwards away from the latch pin 28 on the container wall thus releasing the base to pivot relative to the container wall.

Upward pivotal movement of the flat bar 22 is caused by an upward pressure applied to the bar 22. Thus, required pressure is applied by the fork lift truck by firstly lifting the container to a suitable height then lowering the container so that an object or a structure engages the bar 22. For example, when the contents of the container are to be dumped into a skip, the container is raised to a height above the skip and maneuvered to overlie one side of the skip. The container is then lowered onto the top of that side, the latch 24 will unlock, and when the container body 10 is raised the base 11 will pivot downwards and spill the contents into the skip.

The base 11 has a surrounding depending flange 11A and the flat bar 22 is downwardly and forwardly angled so that the major portion of the bar 22 extends below the level of the bottom edge of the flange 11A.

Thus, in order to unlock the latch, the container is positioned so that when it is lowered the protruding portion of the bar will strike the edge of the skip.

As the base 11 pivots open to empty the contents into the skip the container body 10 is lifted and moved slightly rearwards by the fork truck so that when it is lowered again the casing 23 will strike the edge of the skip and close the container. No upward pressure will thus be on the bar 22 and the latch member 24 will be in its spring-urged position so that the hooked end 27 will re-engage on the latch pin 28 when the base is closed.

Side shields or fans (not shown) of quadrant shape may be attached to the base adjacent the outer faces of the side walls 13 to prevent the contents of the container from falling outside the skin.

A safety chain or the like 32 is provided to secure the container to one or both forks of the fork lift truck to prevent or restrict forward motion of the container relative to the forks during emptying when movement of the contents will tend to move the container forward.

The container wall may be solid or wire mesh. The fork lift brackets may be replaced by or supplemented with lifting points for attachment of the container to a crane.

The brackets 20 may be replaced by openings in the front and rear walls by which the forks can locate under the upper rim of the walls for lifting purposes.

The container is thus self-emptying and self locking and requires no manual assistance apart from operation of the fork lift.

Several modifications may be made without departing from the scope of the invention; for example the pressure actuated mechanism, i.e. the flat bar 22 and hooked latch member 24 may be replaced by a cranked lever which includes a fore and aft flat bar similar to the bar 22 hereinbefore described, and a fore and aft pin which engages a keeper plate on the container front wall. The flat bar may be replaced by another suitable actuator such as a wire cable.

The latch may be provided with a delay-action means so that the locking pin will not withdraw from the keeper while the container is suspended, i.e. while the weight of the container and contents is carried by the locking pin. In such an arrangement pressure on the actuator expands a tension spring but not sufficiently to move the locking pin which is retained in the keeper by the frictional pressure of the load on the base. Only when the base comes to rest, e.g. on the edge of the skip and the loading is taken off the pin will the pin withdraw under the pull from the tension spring.

Figure 4:
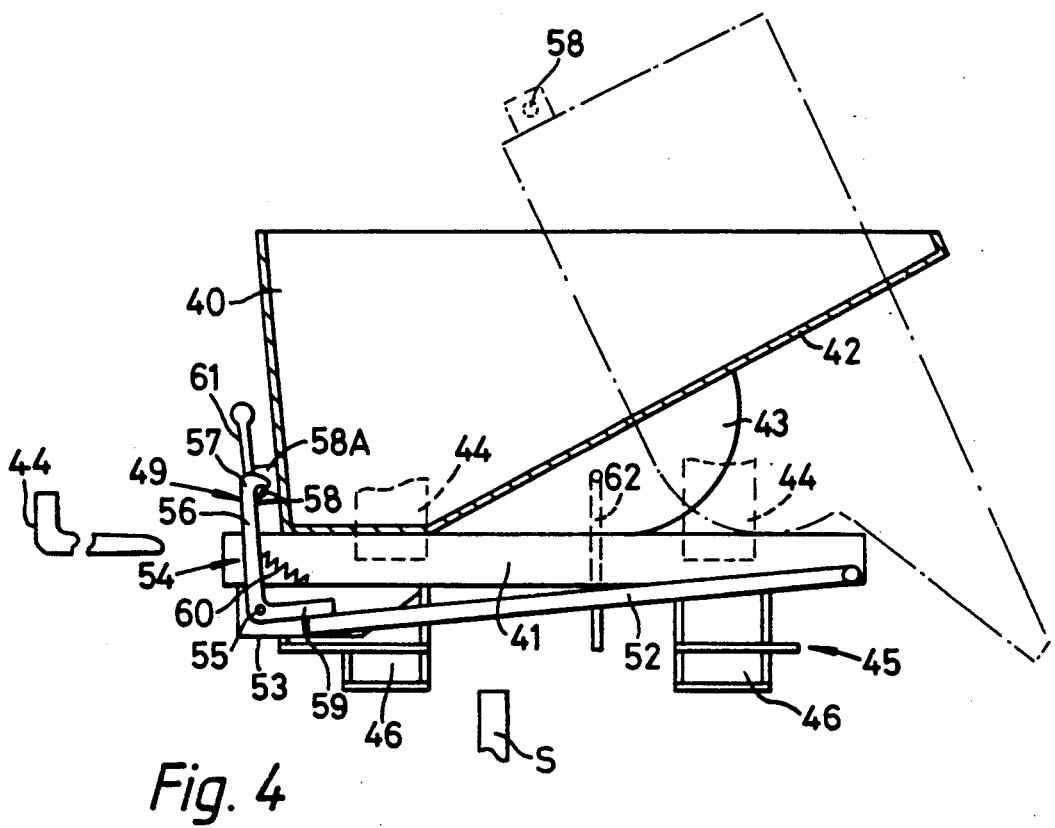
FIG. 4 is a side elevation in section of a self-emptying container according to a second embodiment.

In a second embodiment, FIG. 4, the self-emptying container is a self-tipping skip or self-dumping hopper, having a base 41 on which an open-topped skip or hopper i.e. a container body 40 is mounted to be pivotal in a constant plane between a normal loading position as shown in FIG. 4 and a tipped forward emptying position indicated by chain lines. The skip/hopper has a bottom 42 which, in the normal disposition of the skip/hopper, angles upwards and forwards. The skip/hopper also has a pair of curved side plates 43 which roll along the base 41 as the skip/hopper tips between its two positions.

The base 41 is in the form of a pallet designed for three-way engagement by lift forks 44, i.e. from the rear or from either side. Thus the base 41 is raised off the ground by channels 45 which provide the alternative openings 46 for side engagement.

When the skip/hopper is filled, its center of gravity tends to make it tip forward and when it empties, it tends to tip back to its loading position. A latch mechanism 49 is provided to lock the skip/hopper in its loading position so that it cannot tip forward when filled until the latch is released.

The latch mechanism is as described in the preceding embodiment, the fore and aft flat bar 52 and casing 53 being mounted on the base and the latch member 54 being pivotally attached to the casing by pin 55.

The upright limb 56 is extended relative to the first embodiment, the hooked end 57 engaging a pin 58 carried parallel with the rear wall of the skip by brackets 58A.

The other generally horizontal limb 59 which is urged downwardly by spring 60 extends forwardly and overlies the rear end of the flat bar 52.

Thus, the self-emptying container can be engaged from the rear by lift forks and raised to overlie a surface S as in the first embodiment and be lowered so that the flat bar 52 engages that surface to cause release of the latch and allow self-emptying. When the container is lifted to relieve the pressure on the flat bar, the latch member 54 will return to its spring-urged locking position so that when the empty skip/hopper tilts back to its loading position the latch will automatically re-engage the latch pin 58.

The pallet base 41 may be designed for three-way entry of the forks, i.e. from the rear and from each side. However, when the self-emptying container is lifted from the side, the pressure operated latch mechanism will normally be unable to operate since generally it is unlikely that the fork lift truck will be able to maneuver to bring the flat bar into engagement with the required surface.

Therefore, a standard manually operable handle 61 may also be provided for use on those occasions when automatic latch release is not possible.

Further, in order to prevent accidental tipping of the skip/hopper when the self-emptying container is on ground level, a drop-bar 62 is mounted on e.g. curved plate 43 of the skip/hopper and extending downwards to ground level.

In a modification of the second embodiment (not shown) the pressure operated latch mechanism is adapted to operate in conjunction with the standard latch pin normally used on existing self hopping skips and self-emptying hoppers extending rearwardly from the rear wall of the skip/hopper to engage a latch member which lies transverse and is pivotal in a longitudinal pin. In this modification, the latch member is as described in the second embodiment but disposed transversely, i.e. in a plane at right angles to the fore and aft pressure actuated flat bar. The rear end of the flat bar extends below the end of the horizontal limb of the latch member and the mechanism operates in the same manner as previously described, when the flat bar is lowered onto the edge of a skip to cause the required upward pressure on the flat bar.

The means to cause pressure on the flat bar 22/52 can be other than the edge of a skip, for example, where it is desired to dump the contents onto a floor or sorting area, a rail or bar may be provided above, floor level, or even a brick or similar object able to provide the necessary pressure to the actuator when the self-emptying container is lowered onto it.

In a further modification (not shown) the actuator is operable by forward or rearward motion of the container as opposed to vertical motion in the preferred embodiment. For example, a lever or plate may depend from the base and be connected to the latch member so that when the container is located over a side of a skip it is moved forward to cause the lever or plate to engage against the side of the skip and pivotally or slidably actuate to unlock the latch.

The latch mechanism may include a ratchet device which would cause unlocking of the latch on only alternative actuations of the actuator. Thus, each time the container is brought against a structure the actuator is subjected to pressure, but latch mechanism will be operated only on each alternate occasion.

Reverting to the first embodiment it will be noted that the container is lifted via the lifting brackets when it is intended to operate the latch mechanism to open the base. However, when the container is simply being transported between locations, the forks can alternatively engage under the base.

We claim:

1. A self-emptying free standing container having a base and being adapted to be lifted by a mechanical lift apparatus, the container including relatively movable parts movable to allow emptying, a latch mechanism to normally hold said parts together to prevent emptying, said latch mechanism having a latch member and an actuator member which extends underneath and below the base and is pressure actuated to release the latch member, there being further provided at a lower portion of the container, support means to space the actuator from the ground during storage or loading and to prevent actuation thereof, wherein the support means includes a plurality of spaced support members which are fixed to the container and depend below a level of the actuator, said support members providing open peripheral spaces therebetween which enable the support members to straddle in use a raised surface and allow the actuator member to engage the raised surface to actuate release of the latch by pressure of the raised surface on the actuator member.

2. A self-emptying free standing container having a base and being adapted to be lifted by a mechanical lift apparatus, the container including relatively movable parts movable to allow emptying, a latch mechanism to normally hold said parts together to prevent emptying, said latch mechanism having a latch member and an actuator member which extends underneath and below the base and is pressure actuated to release the latch member, there being further provided at a lower portion of the container, support means to space the actuator from the ground during storage or loading and to prevent actuation thereof, wherein the support means includes a plurality of spaced support members which are fixed to the container and depend below a level of the actuator, said support members providing open peripheral spaces therebetween which enable the support members to straddle in use a raised surface and allow the actuator member to engage the raised surface to actuate release of the latch by pressure of the raised surface on the actuator member; and wherein said latch member is provided to hold said container parts together and prevent emptying, and said actuator extends fore and aft below the base of the container for actuating the latch member and allowing the container to empty; there being further provided a cooperating latch on the body of the container which engages with the latch member to prevent said container emptying.

3. A self-emptying container according to claim 1 or 2 wherein the latch member is urged into its locking position by a spring so as to return to the locking position after the actuator member has released the latch member and the pressure on said actuator member has been removed as the container empties.

4. A self-emptying free standing container having a base and being adapted to be lifted by a mechanical lift apparatus, the container including relatively movable parts movable to allow emptying, a latch mechanism to normally hold said parts together to prevent emptying, said latch mechanism having a latch member and an actuator member which extends underneath and below the base and is pressure actuated to release the latch member, there being further provided at a lower portion of the container, support means to space the actuator from the ground during storage or loading and to prevent actuation thereof, wherein the support means includes a plurality of spaced support members which are fixed to the container and depend below a level of the actuator, said support members providing open peripheral spaces therebetween which enable the support members to straddle in use a raised surface and allow the actuator member to engage the raised surface to actuate release of the latch by pressure of the raised surface on the actuator member; and wherein said actuator member extends fore and aft of the container, below the base thereof, and is pivoted at one end and has another free end, the free end of said actuator member being cooperable with a latch member which is urged by a spring toward said free end of the actuator member; there being further provided a cooperating latch portion on the body of the container which engages with the latch member, said latch member being actuable to release itself from the latch portion on pressure acting on the actuator member.

5. A self-emptying container according to claims 1, 2 or 4 wherein the container includes an upstanding surrounding wall, the base being hinged by a hinge to the wall so that the base and wall are relatively pivotal to open the base of the container and allow emptying of the contents thereof, said latch member locking the base against relative pivotal movement, there further being provided means on the container for connection to lifting apparatus.

6. A self-emptying container according to claim 1, 2 or 4 which is in the form of a tipping skip having an open topped container body mounted on the base, and pivotal in a constant plane between a normal loading position in which the body is upright and is latched to the base by said latch member and a tipped forward emptying position.

7. A self-emptying container according to claim 1, 2 or 4 which is of the type adapted for use with a forklift truck.

8. A self-emptying container according to claim 1 or 2 wherein the actuator member is a flat bar.

9. A self-emptying container according to claim 4, wherein the latch member comprises an L shaped member having two limbs connected at a junction, the L shaped member being pivotal at the junction of the limbs, one of said limbs overlying said free end of the actuator member and the other of said limbs having a hooked end to engage a latch pin on the container body.

10. A self-emptying container according to claim 4, wherein the said free end of the actuator member and an overlying limb of the latch member are located in a casing.

11. A self-emptying container according to claim 5, wherein the said free end of the actuator member and the overlying limb of the latch member are located in a casing.

12. A self-emptying container according to claim 4, wherein the latch member is pivotally mounted to the casing.

13. A self-emptying container according to claim 4, wherein the latch member is pivotally mounted to the casing.

14. A self-emptying container according to claim 4, wherein the actuator member is a flat bar.

15. A self-emptying container having a base and being adapted to be lifted by mechanical lift apparatus, the container including relatively movable parts movable to allow emptying, and a latch mechanism to normally hold said parts together to prevent emptying, said latch mechanism being pressure actuated and extending below said base and being actuated to unlatch said relatively movable parts when movement of the container via the lift apparatus brings the latch mechanism into contact with a surface to generate the required pressure on the mechanism to cause unlatching of the parts, wherein the latch mechanism comprises an actuator member extending fore and aft of the container, below the base thereof, and being pivoted at one end and having another free end, the free end of said actuator member engaging a latch member which is urged by a spring towards said free end of the actuator member, there being further provided a cooperating latch portion on the body of the container which engages with the latch member.

16. A self-emptying container according to claim 15, wherein the container includes an upstanding surrounding wall, the base being hinged by a hinge to the wall and being relatively pivotal to open the base of the container and allow emptying of the contents thereof, said latch mechanism locking the base against relative pivotal movement, there further being provided means on the container for connection to lifting apparatus.

17. A self-emptying container according to claim 15, which is in the form of a tipping skip having an open topped container body mounted on a base, and pivotal in a constant plane between a normal loading position in which the body is upright and is latched to the base by said latch and a tipped-forward emptying position.

18. A self-emptying container according to claim 15, wherein the latch member comprises and L shaped member having two limbs connected at a junction, the L shaped member being pivotal at the junction of the limbs, one of said limbs overlying a free end of the actuator member and the other of said limbs having a hooked end to engage a latch pin on the container body.

19. A self-emptying container according to claim 15, wherein a free end of the actuator member and an overlying limb of the latch member are located in a casing.

20. A self-emptying container according to claim 17, wherein the free end of the actuator member and the overlying limb of the latch member are located in a casing.

21. A self-emptying container according to claim 19, wherein the latch member is pivotally mounted to the casing.

22. A self-emptying container according to claim 20, wherein the latch member is pivotally mounted to the casing.

* * * * *